US011711737B1

(12) United States Patent
Marupaduga (10) Patent No.: US 11,711,737 B1
(45) Date of Patent: Jul. 25, 2023

(54) SELECTING TARGET ACCESS NODES BASED ON UPLINK SPLIT MODE CAPABILITY

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

(21) Appl. No.: 16/933,223

(22) Filed: Jul. 20, 2020

(51) Int. Cl.
*H04W 36/00* (2009.01)
*H04W 52/36* (2009.01)
*H04W 36/38* (2009.01)
*H04W 36/30* (2009.01)

(52) U.S. Cl.
CPC ....... *H04W 36/00837* (2018.08); *H04W 36/30* (2013.01); *H04W 36/38* (2013.01); *H04W 36/0069* (2018.08); *H04W 52/365* (2013.01)

(58) Field of Classification Search
CPC ... H04W 72/04; H04W 72/0413; H04W 76/15; H04W 72/1268; H04W 88/06; H04W 16/14; H04W 76/27; H04W 72/12; H04W 52/146; H04W 52/365
See application file for complete search history.

(56) References Cited

U.S. PATENT DOCUMENTS

| | | | |
|---|---|---|---|
| 2010/0130219 A1* | 5/2010 | Cave et al. | H04W 8/26 455/450 |
| 2012/0270551 A1* | 10/2012 | Hu | H04W 72/0453 455/436 |
| 2016/0277988 A1* | 9/2016 | Moeller et al. | H04W 36/00837 |
| 2017/0374579 A1* | 12/2017 | Wang et al. | H04W 28/0278 |
| 2018/0376383 A1* | 12/2018 | Belghoul et al. | H04W 36/28 |
| 2019/0037468 A1* | 1/2019 | Bongaarts et al. | H04W 36/32 |
| 2019/0090297 A1* | 3/2019 | Lan et al. | H04B 1/0064 |
| 2019/0098606 A1* | 3/2019 | Sharma et al. | H04B 7/0404 |
| 2019/0124708 A1* | 4/2019 | Shi et al. | H04W 88/10 |
| 2019/0335375 A1* | 10/2019 | Yeddala et al. | H04W 36/30 |
| 2019/0357112 A1* | 11/2019 | Shen et al. | H04W 36/30 |

* cited by examiner

*Primary Examiner* — Khalid W Shaheed
(74) *Attorney, Agent, or Firm* — Jones Robb, PLLC (57) ABSTRACT

Methods and systems for preventing or delaying handovers to target access nodes that are not configured to provide uplink split mode, include determining that an uplink usage requirement or a power headroom of a wireless device meets a threshold, and preventing handovers of the wireless device to access nodes that are not capable of utilizing uplink split mode. Access nodes capable of utilizing uplink split mode are configured to receive uplink data via at least two different radio access technologies simultaneously, including 4G LTE and 5G NR.

12 Claims, 6 Drawing Sheets

SELECTING TARGET ACCESS NODES BASED ON UPLINK SPLIT MODE CAPABILITY

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-wave) networks, as well as older legacy networks (such as 3G). In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. In other cases, a combination of transceivers and antennae may be used by access nodes and wireless devices to simultaneously communicate using both 4G and 5G RATs, using transmissions methods known as "concurrent mode", or "split mode" (wherein a single antenna element can be used for both 4G LTE and 5G NR transmissions). A split mode antenna array operating at an access node is thus capable of simultaneously communicating using two different communication protocols. By dividing the antenna array into a first node and second node and supplying the nodes with a common power supply, the access node can wirelessly communicate with devices according to both protocols without increasing overall power consumption and reducing the need for additional equipment on costly real estate. As throughput and connectivity are positively correlated with power output, the split mode antenna array can control throughput and connectivity on each protocol by allocating power between the two nodes.

Further, as wireless device technology improves, increasing numbers of wireless devices are using higher transmit powers to transmit uplink data. For example, uplink MU-MIMO is a new service that applies MIMO technology to transmitting uplink data using a plurality of layers or streams. Therefore, access nodes may further be capable of utilizing "uplink split mode", enabling wireless devices to transmit large amounts of uplink data using both 4G and 5G RATs. However, transitioning to these advanced technologies in today's heterogeneous wireless networks can be associated with problems. In particular, load balancing of wireless devices between two or more neighboring access nodes can be problematic, particularly when the capabilities of the access node and the wireless devices do not match. For example, wireless devices that have high uplink data requirements may not be well-served by access nodes that are not capable of uplink split mode. Thus, standard handovers of these wireless devices, which may be triggered by poor or deteriorating signal conditions from a serving access node, would not benefit the wireless devices if the target access nodes do not support uplink split mode, despite providing better signal conditions.

OVERVIEW

Exemplary embodiments described herein include methods, systems, and processing nodes for preventing or delaying handovers to target access nodes that are not configured to provide uplink split mode. An exemplary method for delaying handovers to a target access node includes determining that an uplink usage requirement of a wireless device meets a threshold, and preventing handovers of the wireless device to access nodes that are not capable of utilizing uplink split mode. For the purposes of this disclosure, access nodes capable of utilizing uplink split mode are configured to receive uplink data via at least two different radio access technologies simultaneously. The uplink usage requirement of the wireless device may be based on a monitored uplink usage over a period of time. The uplink usage requirement of the wireless device may further be based on an uplink buffer amount exceeding a threshold, as determined by a buffer status report transmitted by the wireless device. Further, handovers are delayed for wireless devices that report an available power headroom below a threshold.

Another exemplary method for performing handovers comprises identifying access nodes that are not capable of utilizing uplink split mode, and preventing handovers of wireless devices to the identified access nodes. The preventing of the handovers may be selectively performed for wireless devices that have an uplink usage requirement meeting a threshold. The preventing of the handovers may be selectively performed for wireless devices that have an uplink usage requirement meeting a threshold, or an uplink buffer amount exceeding a threshold, or a power headroom being above a threshold.

Another exemplary method for performing handovers includes determining that signal conditions for a wireless device deteriorate past a first signal condition threshold, determining that the wireless device is associated with a high uplink requirement and/or a low power headroom, and adjusting handover thresholds associated with the wireless device such that the wireless device is discouraged from being handed over to access nodes that do not support uplink split mode. Access nodes that do not support uplink split mode are those that are not configured for simultaneous multi-rat uplink. The handover thresholds can be adjusted for each potential target access node.

Another exemplary method for performing handovers includes determining that signal conditions for a wireless device with a high uplink requirement and/or a low power headroom fall below one or more thresholds, identifying a first one or more target access nodes that support uplink split mode and a second one or more target access nodes that do not support uplink split mode, and triggering a handover of the wireless device to the first one or more target access nodes versus the second one or more target access nodes.

The exemplary embodiments described herein may be performed by a processing node within a system, such as a telecommunication system. For example, an exemplary system for performing handovers includes a first access node that is incapable of simultaneously receiving uplink data via at least two different radio access technologies, and a second access node adjacent the first access node, the second access node being capable of simultaneously receiving uplink data via the at least two different radio access technologies. A processing node communicatively coupled to at least the second access node can be configured to perform operations comprising identifying wireless devices attached to the second access node and having an uplink throughput meeting a threshold and/or a power headroom below a threshold, and adjusting handover thresholds associated with the wireless devices such that handovers of the wireless devices from the second access node to the first access node are prevented.

DETAILED DESCRIPTION

The following disclosure provides methods and systems for selecting target access nodes for a handover of a wireless device with high uplink usage, based on whether or not the target access nodes are capable of or enabled to perform uplink split mode. Uplink split mode (also known as concurrent mode) enables the wireless device to transmit uplink data via at least two carriers simultaneously, such as via 4G LTE and via 5G NR, which enables greater uplink throughput. Therefore, handover thresholds for wireless devices with high uplink usage are modified to encourage such wireless devices to attach (or stay attached) to access nodes capable of uplink split mode. Handover thresholds may similarly be modified for wireless devices that report a low power headroom, since these wireless devices may also benefit from utilizing uplink split mode.

Further, radiofrequency (RF) conditions are balanced with the need for greater uplink throughput. For example, when a wireless device with high uplink usage and/or a low power headroom that is currently attached to an access node capable of uplink split mode experiences poor RF signal conditions, the wireless device is discouraged from requesting a handover to a neighboring access node that does not support uplink split mode, at least until an adjusted handover threshold is reached. In other words, the wireless device with a high uplink usage and/or a low power headroom is encouraged (via handover threshold adjustment) to stay attached to access nodes capable of uplink split mode, despite RF signal conditions deteriorating beyond typical thresholds. Similarly, wireless devices with high uplink usage and/or low power headroom can be encouraged to request attachment to target access nodes that support uplink split mode, based on handover threshold adjustments. The thresholds may be defined by a network operator and can be dynamically adjusted based on overall uplink throughput and availability of different target access nodes.

Therefore, as described herein, a processing node (communicably coupled to, for example, an access node) is configured to perform operations comprising determining that an uplink usage requirement of a wireless device meets a threshold, and preventing handovers of the wireless device to access nodes that are not capable of utilizing uplink split mode. Exemplary access nodes described herein can communicate using a plurality of radio air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users. Further, in split mode or "concurrent mode", individual antenna elements can be configured to simultaneously deploy at least two different air interfaces, which enables the aforementioned wireless devices with high uplink usage to transmit uplink data via each of the at least two air interfaces simultaneously. Thus, while access nodes that are not capable of utilizing uplink split mode may use the 4G LTE RAT for control transmissions and the 5G NR RAT for data transmissions, access nodes capable of uplink split mode can receive uplink data via both 4G LTE and 5G NR RATs. In an exemplary embodiment, a gNodeB portion of a radio access network (RAN) is configured with logic to determine a transmission path for data packets traversing the radio access network. The transmission paths can traverse different RATs, as well as different ports of a cell site router coupled to the 4G eNodeB and 5G gNodeB.

Further, preventing or encouraging handovers of the wireless device comprises adjusting handover thresholds. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time. Alternatively, or in addition, if a target access node is capable of uplink split mode, then a handover threshold of the target access node is lowered, such that a handover of the wireless device to the target access node is performed or encouraged. Adjusting the handover threshold may include decreasing or lowering a threshold signal level associated with the target access node. The adjustment may further comprise increasing or raising a threshold signal level of the serving access node, such that the wireless device is triggered to detach from the first carrier sooner. These adjusted handover thresholds can be transmitted to wireless devices that are associated with high uplink usage requirements and/or low power headroom amounts, thereby enhancing load balancing of such wireless devices without affecting load balancing of other wireless devices that are not associated with high uplink usage requirements and/or low power headroom.

These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-8.

Figure 1:
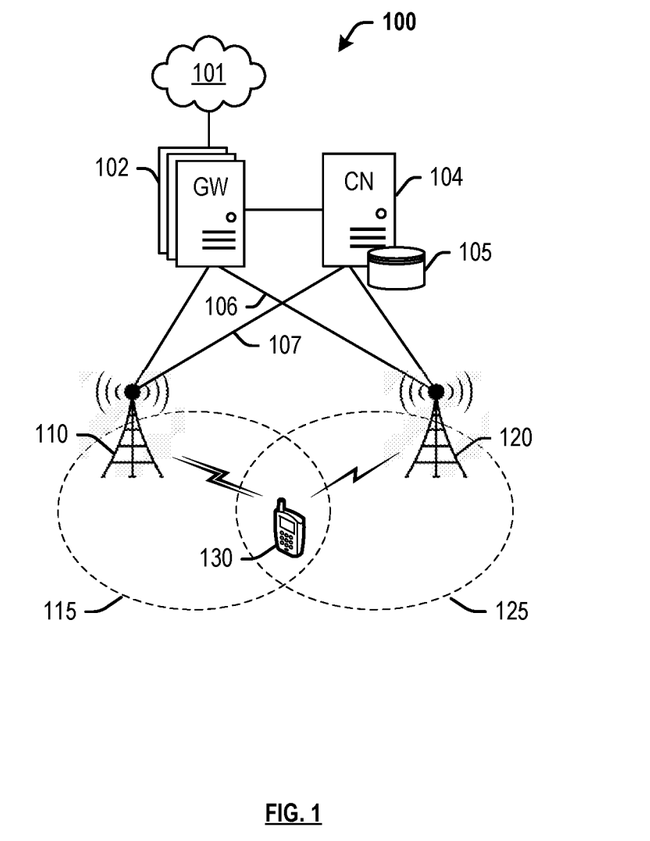
FIG. 1 depicts an exemplary system.

FIG. 1 depicts an exemplary system 100 comprising a communication network 101, gateway 102, controller node 104, access nodes 110, 120, and wireless device 130. In this exemplary embodiment, each of access nodes 110, 120 may be configured to deploy at least two wireless air interfaces, including 4G LTE and 5G NR. Each wireless air interface may be configured to utilize a different frequency band or sub-band, a different channel size or bandwidth, and so on. For example, the 5G NR interface may be configured to utilize higher frequencies and larger channel bandwidths than the 4G LTE interface. Further, access node 110 can be configured to communicate using both interfaces at the same time in what is referred to as "concurrent mode" or "split mode". For example, antenna elements coupled to access node 110 can be configured to simultaneously communicate using 4G LTE and 5G NR. Whereas, access node 120 can be configured to utilize only 5G EN-DC, whereby dual connections are initiated with wireless devices using both 4G and 5G carriers, the 4G carrier being used to transmit control information, and the 5G carrier being used to transmit data information. Thus, access node 120 is not configured to utilize uplink split mode. Although only access nodes 110, 120 and wireless device 130 is illustrated in FIG. 1, system 100 can include various other combinations of carriers/wireless air interfaces, antenna elements, access nodes, and wireless devices, as may be evident to those having ordinary skill in the art in light of this disclosure.

In an exemplary embodiment, wireless device 130 is associated with a high uplink usage requirement and/or a low power headroom. Wireless devices may be associated with high uplink usage requirements when their uplink usage exceeds one or more thresholds. The uplink usage may exceed a threshold for a specified time period before the wireless device 130 is considered as being associated with a high uplink usage requirement. In an exemplary embodiment, the wireless device 130 may report an uplink buffer amount that exceeds a threshold, via for example a buffer status report (BSR). Further, the wireless device 130 may be associated with a low power headroom, determined via a power headroom report (PHR). In either case, a processing node (communicably coupled to, for example, access node 110) is configured to perform operations comprising determining that the uplink usage requirement of wireless device 130 meets a threshold and/or the power headroom is below a threshold, and preventing or delaying a handover of the wireless device 130 to access nodes that are not capable of utilizing uplink split mode, such as access node 120. Preventing or discouraging the handover of the wireless device 130 can include adjusting handover thresholds. A signal quality reported by the wireless device 130 is monitored, wherein the handover thresholds are adjusted such that the signal quality does not deteriorate past a threshold. To discourage or prevent a handover of wireless device 130, a threshold minimum signal level associated with the serving access node 110 may be reduced, and a threshold maximum signal level associated with the target access node 120 may be increased. Thus, the wireless device 130 is more likely to determine that a signal level of the serving access node 110 is at an acceptable level, and that a signal level of the target access node 120 is not at an acceptable level and, thus, a handover is not triggered. On the other hand, access node 120 may be subsequently configured with uplink split mode capability, and such a configuration may be communicated to the processing node (or access node 110 directly, or any other node including controller node 104). In this case, a handover may be encouraged by increasing a threshold minimum signal level associated with the serving access node 110, and reducing a threshold maximum signal level associated with the target access node 120. Thus, the wireless device 130 is more likely to determine that a signal level of the serving access node 110 is not at an acceptable level, and that a signal level of the target access node 120 is at an acceptable level and, thus, a handover is triggered.

In LTE and 5G systems, such a pair of triggers is known as an A4 measurement. Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, in an A5 event, a received first signal level plus a hysteresis may be compared to a first threshold and a received second signal level plus offsets minus a hysteresis may be compared to a second threshold. The first received signal level may comprise a received signal level from the first access node and the second received signal level may comprise a received signal level from a target access node, where the first and seconds signals are received at the wireless device. Some example signal levels may comprise a Received Signal Strength Indicator, (RSSI), Reference Signal Received Quality (RSRQ), RSRP, or any other suitable signal level.

The adjusted handover thresholds are transmitted to the wireless device 130. Further, adjusting the handover thresholds can be performed iteratively based on different thresholds of the signal quality. For example, a signal quality reported by the wireless device 130 is monitored, and the handover thresholds are adjusted such that the signal quality does not deteriorate past a threshold. Thus, adjusting the handover thresholds is performed iteratively based on different thresholds of the signal quality.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Alternatively, access nodes 110, 120 may comprise any short range, low power, small-cell access nodes such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto are further described with reference to FIGS. 3-4.

Wireless device 130 may be any device, system, combination of devices, or other such communication platform capable of communicating wirelessly with access nodes 110, 120 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path - including combinations thereof. Communication links 106, 107 can be wired or wireless and use various communication protocols such as Internet, Internet protocol (IP), local-area network (LAN), S1, optical networking, hybrid fiber coax (HFC), telephony, T1, or some other communication format - including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), SGNR, or combinations thereof. Other wireless protocols can also be used. Communication links 106, 107 can be a direct link or might include various equipment, intermediate components, systems, and networks, such as a cell site router, etc. Communication links 106, 107 may comprise many different signals sharing the same link. Communication links 106, 107 may be associated with many different reference points, such as n1, n2, n3, n4, n5, n6, n7, etc., as well as s1, s3, s4, s5, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of access nodes 110, 120, past or current uplink usage requirements capabilities of wireless device 130, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
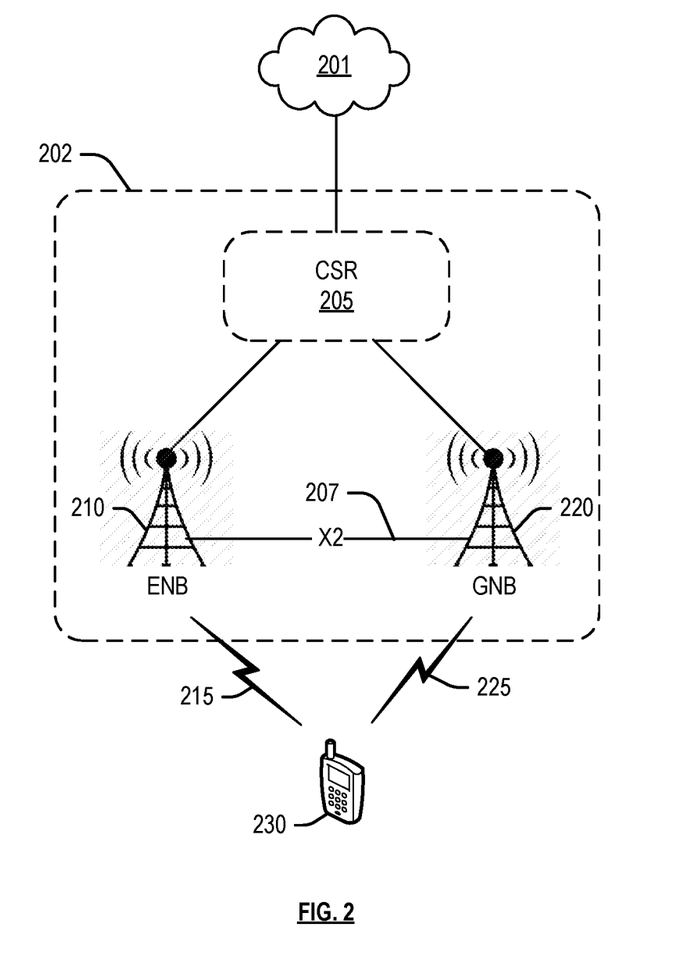
FIG. 2 depicts an exemplary 5G EN-DC radio access network.

FIG. 2 depicts an exemplary system 200 for E-UTRAN-NR Dual Connectivity (EN-DC) using 4G LTE and 5G NR. System 200 includes a communication network 201, a radio access network 202, and a wireless device 230. Radio access network further includes at least a cell site router 205, and access nodes 210, 220. Cell site router 205 can include any network node that is configured to route incoming data packets from network 201 to wireless device 230 via access node(s) 210, 220, and to route outgoing data packets received from the wireless device 230 via access node(s) 210, 220 to the network 201. Therefore, network 201 can include any combination of networks, including a core network, intermediate/backhaul network, or packet data network (PDN). Persons having ordinary skill in the art may note that although only access nodes 210, 220, cell site router 205, and network 201 are illustrated in FIG. 2, other components such as gateways, controller nodes, user plane functions, etc. may be included as well.

In this exemplary embodiment, access node 210 can include a eNodeB, and access node 220 can include a gNodeB. For example, access node 210 can be configured to deploy a wireless interface 215 using a first radio access technology (RAT), e.g. 4G LTE, and access node 220 can be configured to deploy a second wireless interface 225 using a second RAT, e.g. 5G NR. Each RAT can be configured to utilize a different frequency band or sub-band, a different channel size or bandwidth, and so on. For example, the 5G NR wireless interface 225 can be configured to utilize higher frequencies and larger channel bandwidths than the 4G LTE wireless interface 215. Further, access nodes 210, 220 can be configured to communicate using both RATs at the same time. For example, dual connections can be set up with wireless device 230 using both 4G and 5G air interfaces 215, 225 respectively, the 4G wireless interface 215 being used to transmit control information, and the 5G wireless interface 225 being used to transmit data information. For example, a processing node within system 200 (for example, communicatively coupled to access nodes 210, 220, or any other network node) can be configured to determine whether or not wireless device 230 is capable of communicating using both RATs, and instruct the access node 210 to broadcast an indicator in, for example, a system information message. Responsive to the indicator, wireless device 230 can attach to access node 210 which can use the 4G carrier to control and set up a dual connectivity session with wireless device 230. In other words, control information (including SIB messages) is transmitted from the access node 210 using the 4G LTE air interface, while the 5G NR air interface is utilized for transmission of data. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. In an exemplary embodiment utilizing multiple input multiple output (MIMO), wireless device 230 can receive a MIMO data stream using the 5G NR wireless interface, with control signaling that enables the MIMO data stream using the 4G wireless interface.

Further, within radio access network 202, access nodes 210 and 220 can be coupled via a direct communication link 207, which can include an X2 communication link. Access nodes 210 and 220 can communicate control and data information across X2 communication link 207. In an exemplary embodiment, access node 220 includes logic to determine how to allocate data packets between access node 210 and access node 220, wherein the data packets flow between wireless device 230 and a network node on network 201 via CSR 205. Such logic may include a packet data convergence protocol (PDCP) function. Thus, RAN 202 can include a plurality of antenna elements (not shown herein) coupled to access nodes 210 and 220, with different antenna elements configured to deploy a different radio air interface using a different frequency. For example, each antenna element can be configured to deploy a 4G LTE air interface 215 or a 5G NR air interface 225. Different quantities of antenna elements can be configured to deploy (or "assigned" to) a different type of air interface 215, 225, depending on the needs of a network operator or users. Further, in split mode or "concurrent mode", individual antenna elements can be configured to simultaneously deploy at least two different air interfaces 215, 225, which enables wireless device 230 to transmit uplink data via each of the at least two air interfaces 215, 225 simultaneously. Thus, while access nodes that are not capable of utilizing uplink split mode may use the 4G LTE RAT for control transmissions and the 5G NR RAT for data transmissions, access nodes 210 and 220 capable of uplink split mode can receive uplink data via both 4G LTE and 5G NR RATs 215, 225. In an exemplary embodiment, the gNodeB portion 220 of RAN 202 is configured with logic to determine a transmission path for data packets traversing RAN 202. The transmission paths can traverse different RATs 215, 225, as well as different ports of CSR 205.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 and/or RAN 202 may be, comprise, or include computers systems and/or processing nodes. This includes, but is not limited to: access nodes 110, 120, 210, 220, controller node 104, and/or network 101.

Figure 3:
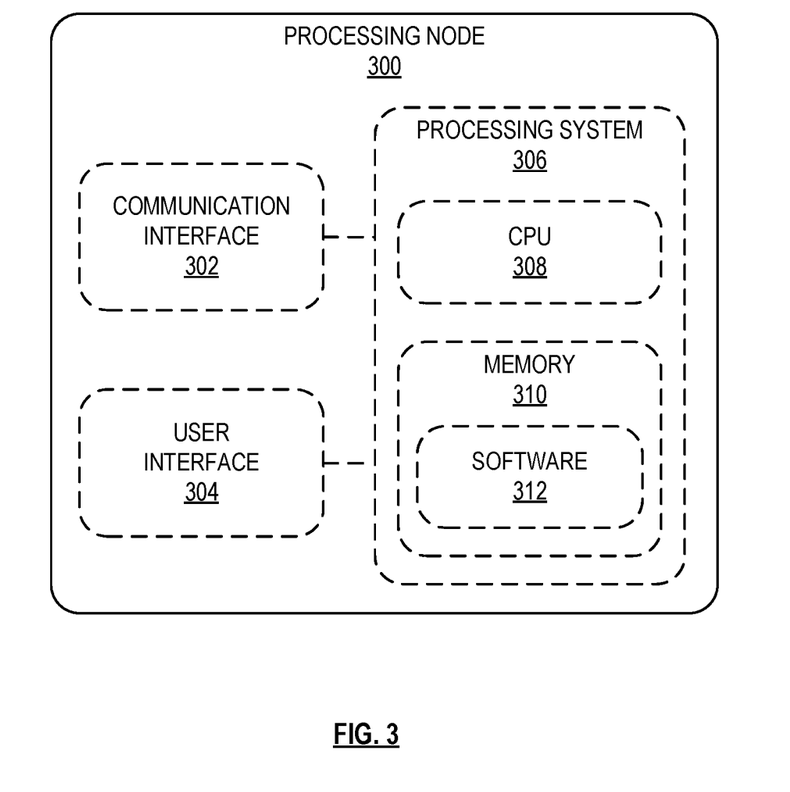
FIG. 3 depicts an exemplary processing node.

FIG. 3 depicts an exemplary processing node 300. Processing node 300 comprises a communication interface 302, user interface 304, and processing system 306 in communication with communication interface 302 and user interface 304. Processing system 306 includes a central processing unit (CPU) 308, and a memory 310, which can comprise a disk drive, flash drive, memory circuitry, or other memory device. Memory 310 can store computer programs, firmware, or some other form of machine-readable instructions, including an operating system, utilities, drivers, network interfaces, applications, or some other type of software. Processing system 306 may include other circuitry to retrieve and execute software 312 from memory 310. Processing node 300 may further include other components such as a power management unit, a control interface unit, etc., which are omitted for clarity. Communication interface 302 permits processing node 300 to communicate with other network elements. User interface 304 permits the configuration and control of the operation of processing node 300.

Further, memory 310 can store a software 312, which may be executed to perform the operations described herein. In an exemplary embodiment, software 312 can include instructions for delaying handovers to a target access node by determining that an uplink usage requirement and/or a power headroom of a wireless device meets a threshold, and preventing handovers of the wireless device to access nodes that are not capable of utilizing uplink split mode. In another exemplary method, software 312 can include instructions for identifying access nodes that are not capable of utilizing uplink split mode, and preventing handovers of wireless devices to the identified access nodes. The preventing of the handovers may be selectively performed for wireless devices that have an uplink usage requirement exceeding a threshold and/or a power headroom below a threshold. In another exemplary method, software 312 can include instructions for determining that signal conditions for a wireless device deteriorate past a first signal condition threshold, determining that the wireless device is associated with a high uplink requirement and/or a low power headroom, and adjusting handover thresholds associated with the wireless device such that the wireless device is discouraged from being handed over to access nodes that do not support uplink split mode. Access nodes that do not support uplink split mode are those that are not configured for simultaneous multi-rat uplink. The handover thresholds can be adjusted for each potential target access node. In another exemplary method, software 312 can include instructions for determining that signal conditions for a wireless device with a high uplink requirement and/or a low power headroom fall below one or more thresholds, identifying a first one or more target access nodes that support uplink split mode and a second one or more target access nodes that do not support uplink split mode, and triggering a handover of the wireless device to the first one or more target access nodes versus the second one or more target access nodes.

Figure 4:
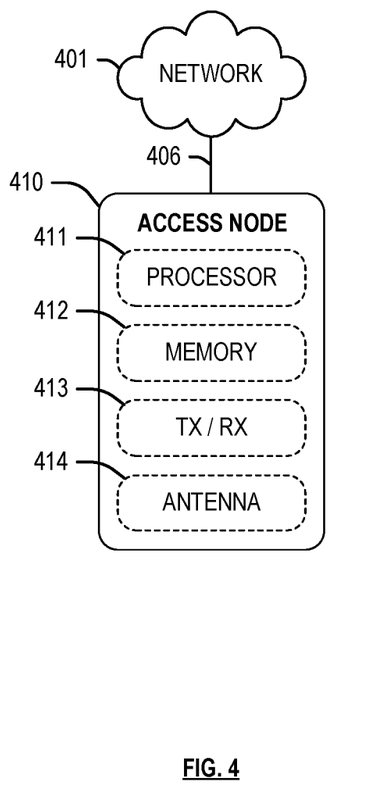
FIG. 4 depicts an exemplary access node.

FIG. 4 depicts an exemplary access node 410. Access node 410 may comprise, for example, a macro-cell access node, such as access node 110 described with reference to FIG. 1. Access node 410 is illustrated as comprising a processor 411, memory 412, a transceiver 413, and antennae 414 (hereinafter referred to as antenna elements 414). Processor 411 executes instructions stored on memory 412, and transceiver 413 (in conjunction with antenna elements 414) enable wireless communication respectively at least two wireless air interfaces, such as 4G LTE and 5G NR. For example, access node 410 may be configured to transmit control information using a first set of antennae elements 414 configured to utilize a 4G LTE interface, and data information using a second set of antennae elements 414 configured to utilize a 5G NR air interface. Alternatively or in addition, each separate air interface maintains its own control and data transmissions. Further, antenna elements 414 may include an array of antenna elements that are configured to deploy air interfaces over one or more wireless sectors, form beams within these sectors, employ multiple-input-multiple-output (MIMO), etc.

Exemplary instructions stored on memory 412 can include instructions for instructions for delaying handovers to a target access node by determining that an uplink usage requirement and/or a power headroom of a wireless device meets a threshold, and preventing handovers of the wireless device to access nodes that are not capable of utilizing uplink split mode. In another exemplary method, memory 412 can include instructions for identifying access nodes that are not capable of utilizing uplink split mode, and preventing handovers of wireless devices to the identified access nodes. The preventing of the handovers may be selectively performed for wireless devices that have an uplink usage requirement exceeding a threshold and/or a power headroom below a threshold. In another exemplary method, memory 412 can include instructions for determining that signal conditions for a wireless device deteriorate past a first signal condition threshold, determining that the wireless device is associated with a high uplink requirement and/or a low power headroom, and adjusting handover thresholds associated with the wireless device such that the wireless device is discouraged from being handed over to access nodes that do not support uplink split mode. Access nodes that do not support uplink split mode are those that are not configured for simultaneous multi-rat uplink. The handover thresholds can be adjusted for each potential target access node. In another exemplary method, memory 412 can include instructions for determining that signal conditions for a wireless device with a high uplink requirement and/or a low power headroom fall below one or more thresholds, identifying a first one or more target access nodes that support uplink split mode and a second one or more target access nodes that do not support uplink split mode, and triggering a handover of the wireless device to the first one or more target access nodes versus the second one or more target access nodes.

Figure 5:
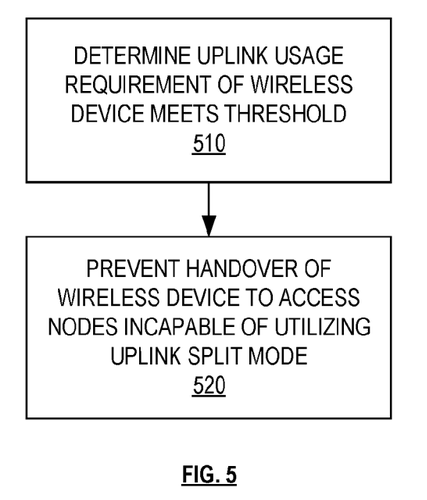
FIG. 5 depicts an exemplary method for performing handovers.

FIG. 5 depicts an exemplary method for selecting a target access node for wireless devices with high uplink usage requirements. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, it is determined that an uplink usage requirement of a wireless device meets a threshold, and at 520, handovers of the wireless device to access nodes that are not capable of utilizing uplink split mode are prevented. For the purposes of this disclosure, access nodes capable of utilizing uplink split mode are configured to receive uplink data via at least two different radio access technologies simultaneously. Exemplary access nodes described herein can communicate using a plurality of radio air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users. Further, in split mode or "concurrent mode", individual antenna elements can be configured to simultaneously deploy at least two different air interfaces, which enables the aforementioned wireless devices with high uplink usage to transmit uplink data via each of the at least two air interfaces simultaneously. Thus, while access nodes that are not capable of utilizing uplink split mode may use the 4G LTE RAT for control transmissions and the 5G NR RAT for data transmissions, access nodes capable of uplink split mode can receive uplink data via both 4G LTE and 5G NR RATs. In an exemplary embodiment, a gNodeB portion of a radio access network (RAN) is configured with logic to determine a transmission path for data packets traversing the radio access network. The transmission paths can traverse different RATs, as well as different ports of a cell site router coupled to the 4G eNodeB and 5G gNodeB. Further, wireless devices may be associated with high uplink usage requirements when their uplink usage exceeds one or more thresholds. The uplink usage may exceed a threshold for a specified time period before the wireless device is considered as being associated with a high uplink usage requirement. In an exemplary embodiment, the wireless device may report an uplink buffer amount that exceeds a threshold, via for example a buffer status report (BSR).

Further, preventing or encouraging handovers of the wireless device at 520 comprises adjusting handover thresholds. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time. Alternatively or in addition, if a target access node is capable of uplink split mode, then a handover threshold of the target access node is lowered, such that a handover of the wireless device to the target access node is performed or encouraged. Adjusting the handover threshold may include decreasing or lowering a threshold signal level associated with the target access node. The adjustment may further comprise increasing or raising a threshold signal level of the serving access node, such that the wireless device is triggered to detach from the first carrier sooner. These adjusted handover thresholds can be transmitted to wireless devices that are associated with high uplink usage requirements, thereby enhancing load balancing of such wireless devices without affecting load balancing of other wireless devices that are not associated with high uplink usage requirements.

Figure 6:
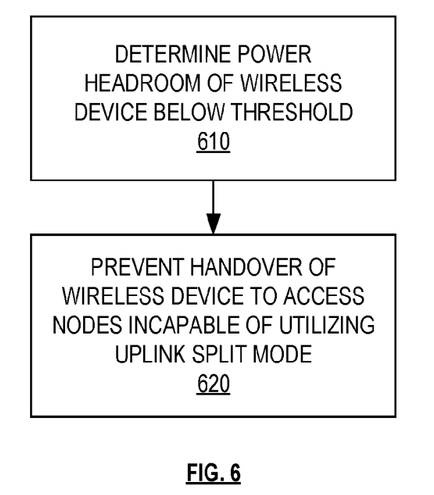
FIG. 6 depicts another exemplary method for performing handovers.

FIG. 6 depicts an exemplary method for selecting a target access node for wireless devices with low power headroom. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that a power headroom of a wireless device is below a threshold, and at 620, handovers of the wireless device to access nodes that are not capable of utilizing uplink split mode are prevented. The power headroom of the wireless device may be determined via a power headroom report (PHR). Since wireless devices with low power headroom benefit from being provided with more uplink resources and/or alternative communication channels (e.g. 4G LTE and 5G NR), they may be better served by access nodes capable of uplink split mode. For the purposes of this disclosure, access nodes capable of utilizing uplink split mode are configured to receive uplink data via at least two different radio access technologies simultaneously. Exemplary access nodes described herein can communicate using a plurality of radio air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users. Further, in split mode or "concurrent mode", individual antenna elements can be configured to simultaneously deploy at least two different air interfaces, which enables the aforementioned wireless devices with high uplink usage to transmit uplink data via each of the at least two air interfaces simultaneously. Thus, while access nodes that are not capable of utilizing uplink split mode may use the 4G LTE RAT for control transmissions and the 5G NR RAT for data transmissions, access nodes capable of uplink split mode can receive uplink data via both 4G LTE and 5G NR RATs. In an exemplary embodiment, a gNodeB portion of a radio access network (RAN) is configured with logic to determine a transmission path for data packets traversing the radio access network. The transmission paths can traverse different RATs, as well as different ports of a cell site router coupled to the 4G eNodeB and 5G gNodeB.

Further, preventing or encouraging handovers of the wireless device at 620 comprises adjusting handover thresholds. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time. Alternatively or in addition, if a target access node is capable of uplink split mode, then a handover threshold of the target access node is lowered, such that a handover of the wireless device to the target access node is performed or encouraged. Adjusting the handover threshold may include decreasing or lowering a threshold signal level associated with the target access node. The adjustment may further comprise increasing or raising a threshold signal level of the serving access node, such that the wireless device is triggered to detach from the first carrier sooner. These adjusted handover thresholds can be transmitted to wireless devices that are associated with high uplink usage requirements, thereby enhancing load balancing of such wireless devices without affecting load balancing of other wireless devices that are not associated with high uplink usage requirements.

Figure 7:
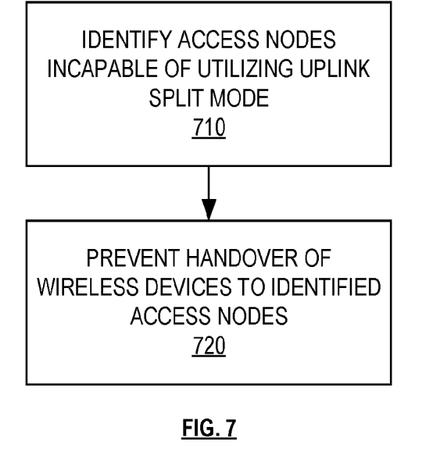
FIG. 7 depicts another exemplary method for performing handovers.

FIG. 7 depicts an exemplary method for selecting a target access node for wireless devices with high uplink usage requirements. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, access nodes that are not capable of utilizing uplink split mode are identified, and at 720, handovers of wireless devices to the identified access nodes are prevented. The preventing of the handovers may be selectively performed for wireless devices that have an uplink usage requirement meeting a threshold. Exemplary access nodes described herein can communicate using a plurality of radio air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users. Further, in split mode or "concurrent mode", individual antenna elements can be configured to simultaneously deploy at least two different air interfaces, which enables the aforementioned wireless devices with high uplink usage to transmit uplink data via each of the at least two air interfaces simultaneously. Thus, while access nodes that are not capable of utilizing uplink split mode may use the 4G LTE RAT for control transmissions and the 5G NR RAT for data transmissions, access nodes capable of uplink split mode can receive uplink data via both 4G LTE and 5G NR RATs. In an exemplary embodiment, a gNodeB portion of a radio access network (RAN) is configured with logic to determine a transmission path for data packets traversing the radio access network. The transmission paths can traverse different RATs, as well as different ports of a cell site router coupled to the 4G eNodeB and 5G gNodeB.

Once the access nodes are identified as being incapable of utilizing uplink split mode, at 720, preventing or encouraging handovers of the wireless device comprises adjusting handover thresholds. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time. Alternatively or in addition, if a target access node is capable of uplink split mode, then a handover threshold of the target access node is lowered, such that a handover of the wireless device to the target access node is performed or encouraged. Adjusting the handover threshold may include decreasing or lowering a threshold signal level associated with the target access node. The adjustment may further comprise increasing or raising a threshold signal level of the serving access node, such that the wireless device is triggered to detach from the first carrier sooner. These adjusted handover thresholds can be transmitted to wireless devices that are associated with high uplink usage requirements, thereby enhancing load balancing of such wireless devices without affecting load balancing of other wireless devices that are not associated with high uplink usage requirements.

Figure 8:
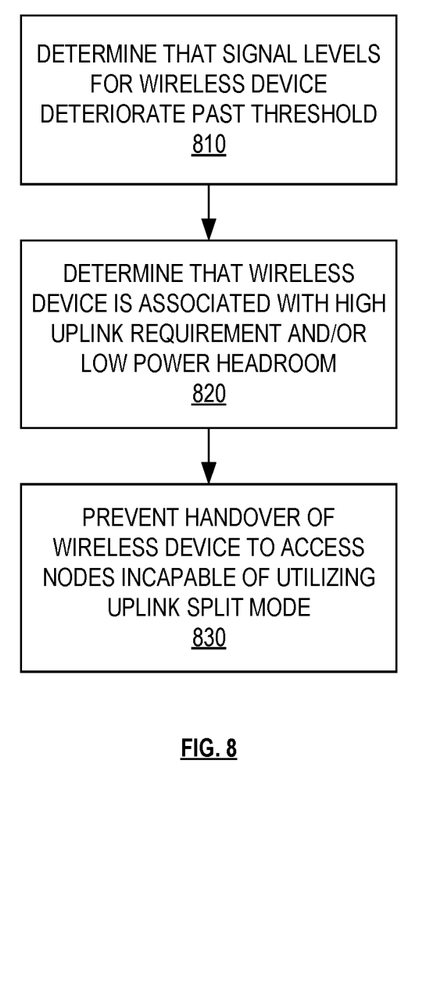
FIG. 8 depicts another exemplary method for performing handovers.

FIG. 8 depicts an exemplary method for selecting a target access node for wireless devices with high uplink usage requirements. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, it is determined that signal conditions for a wireless device deteriorate past a first signal condition threshold. At 820, it is determined that the wireless device is associated with a high uplink requirement and/or a low power headroom, and at 830, handover thresholds associated with the wireless device are adjusted such that the wireless device is discouraged from being handed over to access nodes that do not support uplink split mode. Access nodes that do not support uplink split mode are those that are not configured for simultaneous multi-rat uplink. The handover thresholds can be adjusted for each potential target access node. A signal quality reported by the wireless device is monitored, wherein the handover thresholds are adjusted such that the signal quality does not deteriorate past a threshold. To discourage or prevent a handover wireless device, a threshold minimum signal level associated with the serving access node may be reduced, and a threshold maximum signal level associated with the target access node may be increased. Thus, the wireless device is more likely to determine that a signal level of the serving access node is at an acceptable level, and that a signal level of the target access node is not at an acceptable level and, thus, a handover is not triggered. On the other hand, a different target access node may be configured with uplink split mode capability, and such a configuration may be communicated to a processing node or serving access node directly (via, for example, an X2 connection). In this case, a handover may be encouraged by increasing a threshold minimum signal level associated with the serving access node, and reducing a threshold maximum signal level associated with the target access node. Thus, the wireless device is more likely to determine that a signal level of the serving access node is not at an acceptable level, and that a signal level of the target access node is at an acceptable level and, thus, a handover is triggered.

In LTE and 5G systems, such a pair of triggers is known as an A4 measurement. Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, in an A5 event, a received first signal level plus a hysteresis may be compared to a first threshold and a received second signal level plus offsets minus a hysteresis may be compared to a second threshold. The first received signal level may comprise a received signal level from the first access node and the second received signal level may comprise a received signal level from a target access node, where the first and seconds signals are received at the wireless device. Some example signal levels may comprise a Received Signal Strength Indicator, (RSSI), Reference Signal Received Quality (RSRQ), RSRP, or any other suitable signal level.

Figure 9:
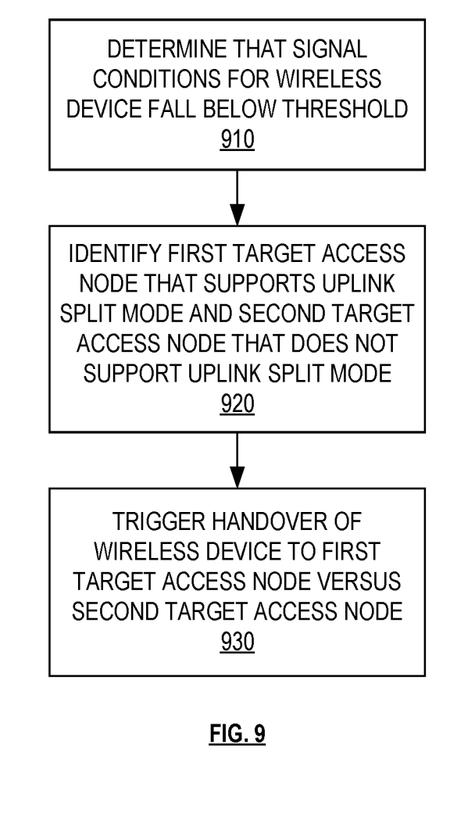
FIG. 9 depicts an exemplary method for selecting a target access node for wireless devices with high uplink usage requirements and/or low power headroom.

FIG. 9 depicts an exemplary method for selecting a target access node for wireless devices with high uplink usage requirements and/or low power headroom. The method of FIG. 9 may be implemented by a processing node communicatively coupled to one or more access nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, it is determined that signal conditions for a wireless device with a high uplink requirement and/or low power headroom fall below one or more thresholds. At 920, a first one or more target access nodes that support uplink split mode are identified and a second one or more target access nodes that do not support uplink split mode are identified. At 930, a handover of the wireless device to the first one or more target access nodes is triggered versus the second one or more target access nodes.

Thus, radiofrequency (RF) conditions are balanced with the need for greater uplink throughput. For example, when a wireless device with high uplink usage and/or low power headroom that is currently attached to an access node capable of uplink split mode experiences poor RF signal conditions, the wireless device is discouraged from requesting a handover to a neighboring access node that does not support uplink split mode, at least until an adjusted handover threshold is reached. In other words, the wireless device with a high uplink usage and/or low power headroom is encouraged (via handover threshold adjustment) to stay attached to access nodes capable of uplink split mode, despite RF signal conditions deteriorating beyond typical thresholds. Similarly, wireless devices with high uplink usage can be encouraged to request attachment to target access nodes that support uplink split mode, based on handover threshold adjustments. The thresholds may be defined by a network operator and can be dynamically adjusted based on overall uplink throughput and availability of different target access nodes. In an exemplary embodiment, it is determined that the signal conditions deteriorate a plurality of signal condition thresholds, responsive to which the handover thresholds are iteratively adjusted. When a final signal condition threshold is reached (as configured by a network operator), the handover thresholds are no longer adjusted, and handovers may be performed. In an exemplary embodiment, a first set of signal condition or handover thresholds can be associated with a first set of corresponding uplink usage thresholds, and a second set of signal condition or handover thresholds can be associated with a first set of corresponding power headroom thresholds. Additional combinations and permutations of reductions may be envisioned by those having ordinary skill in the art in light of this disclosure. Further, while 4G LTE and 5G NR are described in the above embodiments, the disclosed operations may apply to different combinations of radio air interfaces, including any combination of radio air interfaces within the same or different radio-access technologies, such as multiple different 4G carriers, 5G carriers, or any future wireless technology.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing handovers, the method comprising:
   determining that an uplink usage requirement of a wireless device meets a threshold, the wireless device being attached to a first access node capable of utilizing uplink split mode in which the access node is configured to receive uplink data via at least two different radio technologies simultaneously, the first access node exhibiting first signal conditions;
   preventing handovers of the wireless device to a second access node exhibiting second signal conditions superior to the first signal conditions, the second access node being incapable of utilizing uplink split mode,
   wherein preventing handovers of the wireless device comprises raising handover thresholds related to the second signal conditions and associated with the second access node; and
   monitoring a signal quality reported by the wireless device, wherein the handover thresholds are raised such that the signal quality does not deteriorate past a threshold wherein raising the handover thresholds is performed iteratively based on different thresholds of the signal quality.

2. The method of claim 1, wherein the at least two different radio access technologies comprise 4G long-term evolution (LTE) and 5G new radio (NR).

3. The method of claim 1, wherein the uplink usage requirement is based on a buffer status report received from the wireless device.

4. The method of claim 1, further comprising determining that the wireless device reports a power headroom below a threshold.

5. A method for performing handovers, the method comprising:
  determining that signal conditions for a wireless device deteriorate past a first signal condition threshold, the wireless device being attached to an access node capable of utilizing uplink split mode in which the access node is configured to receive uplink data via at least two different radio technologies simultaneously;
  determining that the wireless device is associated with one or more of a high uplink requirement or a low power headroom;
  adjusting handover thresholds associated with the wireless device such that the wireless device is discouraged from being handed over from the first access node to access nodes exhibiting signal conditions above the first signal condition threshold and that do not support uplink split mode,
  wherein adjusting the handover thresholds comprises raising handover thresholds related to the signal conditions and associated with the access nodes that do not support uplink split mode; and
  monitoring the signal quality reported by the wireless device, wherein the handover thresholds are raised such that the signal quality does not deteriorate past a threshold, wherein raising the handover thresholds is performed iteratively based on different thresholds of the signal quality.

6. The method of claim 5, wherein the at least two different radio access technologies comprise 4G long-term evolution (LTE) and 5G new radio (NR).

7. The method of claim 5, further comprising:
  identifying one or more potential target access nodes that support uplink split mode; and
  performing a handover of the wireless device to the one or more potential target access nodes.

8. A system for performing handovers, the system comprising:
  a first access node that is incapable of simultaneously receiving uplink data via at least two different radio access technologies;
  a second access node adjacent the first access node, the second access node being capable of simultaneously receiving uplink data via the at least two different radio access technologies; and
  a processing node communicatively coupled to at least the second access node, the processing node being configured to perform operations comprising:
    identifying wireless devices attached to the second access node and having either an uplink throughput above a first threshold or a power headroom below a second threshold; and
    adjusting handover thresholds related to signal quality associated with the wireless devices such that handovers of the wireless devices from the second access node to the first access node are prevented on the condition the first access node exhibits superior signal quality compared to the second access node,
  wherein adjusting the handover thresholds comprises raising handover thresholds associated with the first access node, and
  monitoring the signal quality reported by the wireless device, wherein the handover thresholds are raised such that the signal quality does not deteriorate past a threshold, wherein raising the handover thresholds is performed iteratively based on different thresholds of the signal quality.

9. The system of claim 8, wherein the at least two different radio access technologies comprise 4G long-term evolution (LTE) and 5G new radio (NR).

10. The system of claim 8, wherein the operations further comprise balancing the adjusting of the handover thresholds with a signal quality reported by the wireless devices.

11. The system of claim 10, wherein the balancing comprise adjusting the handover thresholds such that the signal quality does not deteriorate past a threshold.

12. The system of claim 11, wherein adjusting the handover thresholds is performed iteratively based on different thresholds of the signal quality.

* * * * *